United States Patent
Mishra et al.

(10) Patent No.: US 11,875,190 B2
(45) Date of Patent: Jan. 16, 2024

(54) METHODS AND SYSTEMS FOR AI-BASED LOAD BALANCING OF PROCESSING RESOURCES IN DISTRIBUTED ENVIRONMENTS

(71) Applicant: LIVEPERSON, INC., New York, NY (US)

(72) Inventors: Amit Mishra, Bloomfield, CO (US); Thorsten Ohrstrom Sandgren, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/121,708

(22) Filed: Mar. 15, 2023

(65) Prior Publication Data

US 2023/0297433 A1   Sep. 21, 2023

Related U.S. Application Data

(60) Provisional application No. 63/319,984, filed on Mar. 15, 2022.

(51) Int. Cl.
*G06F 9/455* (2018.01)
*G06F 9/50* (2006.01)

(52) U.S. Cl.
CPC ............ *G06F 9/505* (2013.01); *G06F 9/5077* (2013.01)

(58) Field of Classification Search
CPC .................................................... G06F 9/5077
USPC ............................................................. 718/1
See application file for complete search history.

(56) References Cited

U.S. PATENT DOCUMENTS

| | | | |
|---|---|---|---|
| 6,782,408 B1* | 8/2004 | Chandra | G06F 9/5061 709/224 |
| 11,226,844 B1* | 1/2022 | Palmer | G06F 9/505 |
| 11,310,155 B1* | 4/2022 | Qian | H04L 45/123 |
| 2013/0185729 A1* | 7/2013 | Vasic | G06F 9/5072 718/104 |
| 2013/0205295 A1* | 8/2013 | Ebcioglu | G06F 9/45558 718/1 |

(Continued)

OTHER PUBLICATIONS

International Search Report and Written Opinion dated May 25, 2023 for PCT Application No. PCT/US2023/015244, 13 pages.

(Continued)

*Primary Examiner* — Mehran Kamran
(74) *Attorney, Agent, or Firm* — POLSINELLI LLP

(57) ABSTRACT

Systems and method are provided for load balancing in distributed networks. A computing device uses historical resource allocation data associated with a service deployed within a distributed network to train a machine-learning model configured to generate a threshold processing load usable to determine when processing resources allocated to a service within a particular distributed network are to be increased. An autoscaler of the computing device may instantiate a first quantity of partitions within a processing node of the particular distributed network. The computing device may execute the machine-learning model using a load value associated with the first quantity of partitions to generate a threshold processing load. Upon receiving an updated load value that is greater than the threshold process load, the autoscaler may instantiate a second quantity of partitions and, in response, modify the autoscaler based on the updated load value.

20 Claims, 5 Drawing Sheets

(56) References Cited

U.S. PATENT DOCUMENTS

| | | | |
|---|---|---|---|
| 2013/0238780 A1 | 9/2013 | Devarakonda et al. | |
| 2016/0239318 A1 | 8/2016 | Wagner | |
| 2017/0126792 A1* | 5/2017 | Halpern | H04L 67/1001 |
| 2017/0228257 A1 | 8/2017 | Dong et al. | |
| 2018/0285166 A1* | 10/2018 | Roy | G06F 11/3006 |
| 2019/0317826 A1 | 10/2019 | Jain et al. | |
| 2019/0332415 A1 | 10/2019 | Krishnan et al. | |
| 2020/0127947 A1* | 4/2020 | Meyer | H04L 67/10 |
| 2020/0142788 A1* | 5/2020 | Hu | G06F 9/5077 |
| 2020/0175000 A1* | 6/2020 | Borrill | G06F 16/2379 |
| 2021/0029080 A1* | 1/2021 | Shribman | G06F 9/4555 |
| 2021/0051060 A1* | 2/2021 | Parvataneni | H04L 41/5041 |
| 2021/0173719 A1* | 6/2021 | Chester | G06F 9/455 |
| 2021/0357255 A1 | 11/2021 | Mahadik et al. | |
| 2021/0377340 A1* | 12/2021 | Friedrich | H04L 67/1029 |
| 2022/0019482 A1 | 1/2022 | Jiang et al. | |
| 2022/0124013 A1* | 4/2022 | Chitalia | G06F 11/3433 |
| 2022/0244993 A1* | 8/2022 | MacDonald | G06F 11/3447 |
| 2022/0286499 A1* | 9/2022 | Choi | H04L 67/1014 |
| 2022/0300345 A1* | 9/2022 | Reijonen | G06F 9/5022 |
| 2022/0357861 A1* | 11/2022 | Lee | G06F 9/5072 |
| 2022/0417173 A1* | 12/2022 | Jijumon | H04L 41/0897 |
| 2023/0104787 A1* | 4/2023 | Hassan | G06F 9/5044 |
| | | | 718/104 |

OTHER PUBLICATIONS

International Search Report and Written Opinion dated Jun. 5, 2023 for PCT Application No. PCT/US2023/015254, 9 pages.

* cited by examiner

METHODS AND SYSTEMS FOR AI-BASED LOAD BALANCING OF PROCESSING RESOURCES IN DISTRIBUTED ENVIRONMENTS

CROSS-REFERENCE TO RELATED APPLICATIONS

The present patent application claims the priority benefit of U.S. provisional patent application No. 63/319,984 filed Mar. 15, 2022, the disclosures of which are incorporated by reference herein.

TECHNICAL FIELD

This disclosure generally relates to load-balancing in distributed environments; and more specifically to load-balancing dynamically allocated resources in cloud environments.

BACKGROUND

Large scale applications, such as applications configured for use by large sets of users, has progressed from edge computing (e.g., where the client device executed a discrete copy of the application capable of isolated execution). Such applications can leverage the computing resources of a server to reduce the resources needed by the client device to execute the application. As a result, application can be developed with increased complexity without the concern that client devices will have a sufficient quantity processing resources to execute the application. In addition, as the size of the application increases or as the processing load increases (e.g., more users operate the application, etc.), the server may require more processing resources to maintain the usability of the application. In distributed environments, adding additional processing resources can be as simple as allocating processing resources from other hardware devices within the environment (e.g., those having a quantity of processing resources available for allocation by client devices). The ease in which additional processing resources and/or hardware device can be allocated to an application operating in distributed environments causes applications to over allocate processing resources, which may prevent other application and/or services from receiving processing resources needed to maintain a consistent functionality and may cause applications and/or services of the distributed to compete for processing resources.

SUMMARY

Methods and systems are described herein for load-balancing dynamically allocated resources in cloud environments. The methods include: receiving historical resource allocation data associated with a service deployed within a distributed network; training a machine-learning model using the historical resource allocation data, the machine-learning model being configured to generate a threshold processing load usable to determine when processing resources allocated to a particular service within a particular distributed network are to be increased; instantiating, by an autoscaler, a first set of partitions with a processing node, the first set of partitions configured to support the particular service accessible by a plurality of users, the first set of partitions including a first quantity of partitions; receiving a load value corresponding to the first set of partitions; executing the machine-learning model using the load value, the machine-learning model generating a threshold processing load; receiving an updated load value corresponding to the first set of partitions; determining that the updated load value is greater than the threshold process load; instantiating, by the autoscaler and in response to determining that the updated load value is greater than the threshold process load, a second set of partitions, the second set of partitions including a second quantity of partitions determined based on the first quantity of partitions; and modifying the autoscaler based on the updated load value and in response to instantiating the second set of partitions.

Systems are described herein for load-balancing dynamically allocated resources in cloud environments. The systems include one or more processors and a non-transitory computer-readable medium storing instructions that, when executed by the one or more processors, cause the one or more processors to perform any of the methods as previously described.

Non-transitory computer-readable media are described herein for storing instructions that, when executed by the one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
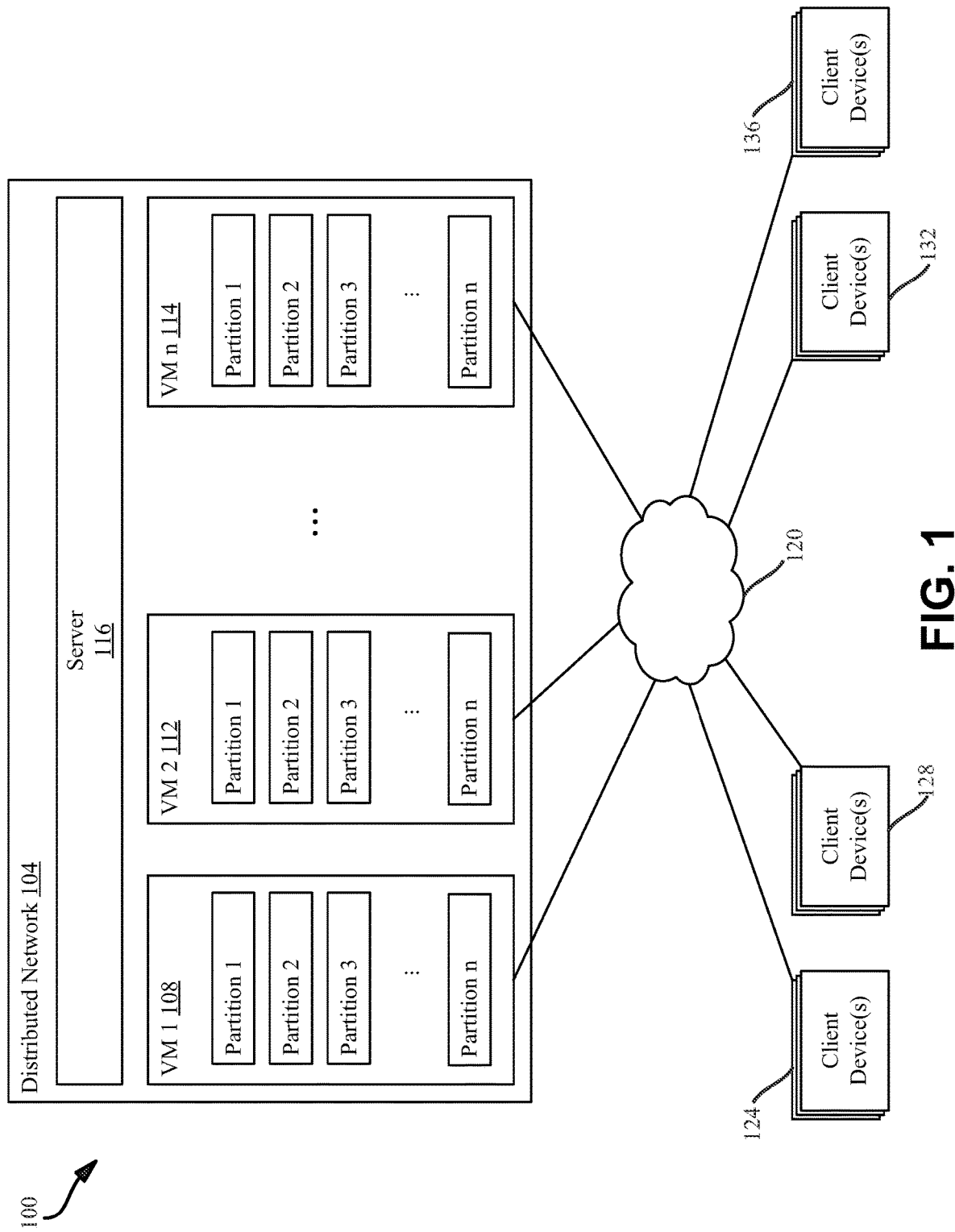
FIG. 1 illustrates an example distributed network environment in which an application may be provided for access by a set of client devices according to aspects of the present disclosure.

The present disclosure includes systems and methods for load-balancing dynamically allocated resources in distributed networks. A distributed network (e.g., such as a cloud network, wide area network, mesh network, or the like) may provide resources for services provided to a large, variable set of users. In some examples, the distributed network may include an autoscaler configured to manage the processing resources of a service (e.g., an application, one or more processes or functions of an application, one or more processes, etc.). The autoscaler may instantiate a set of partitions within a processing node (e.g., such as a processing device, server, virtual machine, etc.) of the distributed network. A partition may include one or more containers (e.g., a self-contained runtime environment) that executes an instance of a service or a portion of a service that execute across multiple containers and/or partitions. Each partition may be allocated a preconfigured set processing resources (e.g., processing cycles, volatile memory, non-volatile memory, network bandwidth, etc.) from the processing node to enable the service or processes thereof to be executed within the partition. If the processing load of the service increases (e.g., due to additional users accessing the service at a same time, software/hardware faults within partitions, etc.), the autoscaler may dynamically scale the processing resources allocated to the service by instantiating additional partitions, adding processing nodes etc.

In some instances, partitions may be allocated to a service based on n-modular redundancy, in which a quantity of partitions are to be allocated for use by the service and a quantity of partitions are to be allocated for fault tolerance (e.g., such as when a partition fails or becomes unresponsive due to, for example, hardware or software faults, interrupts, processor stalls, memory deadlocks, etc.). In some examples, the autoscaler may use 2n-modular redundancy where a same quantity of partitions is allocated for use as allocated for fault tolerance. If the distributed network detects a processing load (e.g., the percent of consumed processing resources allocated to the service relative to a total quantity of processing resources allocated to the particular service) that is greater than a threshold, the autoscaler may double a quantity of partitions instantiated for the service to preserve the 2n-modular redundancy. Doubling the quantity of partitions available for allocation each time a high load is detected may reduce the percentage of processing resources consumed (e.g., by 50%) and increases a quantity of available partitions for redundancy. In other examples, other variations of n-modular redundancy may be used such as, but not limited to, $x*n$, $n+x$, etc. (where x is a real number between 1 and 2).

In some examples, doubling the quantity of partitions for the particular service may cause the distributed network to allocate an excess quantity of processing resources to the particular service. For example, a service may include 250 partitions allocated for use and another 250 partitions reserved for fault tolerance. When the autoscaler detects that the current processing load (e.g., percentage of the allocated processing resources consumed, etc.) is above a threshold, the total number of partitions may double be doubled 500 to 1000 partitions causing the service to have 500 partitions allocated for fault tolerance. Increasing the quantity of partitions for fault tolerance may not change the likelihood of partition failure. As the quantity of partitions allocated to the service is increased, the percentage of partitions allocated for fault tolerance can be reduced.

The autoscaler may define a dynamic threshold processing load that may determine when additional processing resources are to be allocated to the service. The threshold processing load may be adjusted based on the status of service and/or the distributed network to modify the how additional processing resources are allocated. In some instances, the autoscaler may include a machine-learning model configured to generate the threshold processing load based on a quantity of partitions already allocated to the particular service and the percentage of processing resources being consumed, an expected processing load, a time of year, a quantity of available processing resources to allocate to the particular service, combinations thereof, or the like. The autoscaler may be reconfigured using the threshold processing load. The autoscaler may then monitor the current processing load relative to the threshold processing load to determine whether additional processing resources should be allocated to the particular service.

In other instances, the autoscaler may include a default threshold processing load based on a quantity of partitions allocated to the particular service. As the quantity of partitions allocated to the service is increased, the default threshold processing load may be increased. Increasing the default threshold processing load increases the processing load needed to cause the autoscaler to allocate additional processing resources to the service. For example, the default threshold processing load set to a first value x. When the total quantity of partitions allocated to the service (e.g., partitions allocated for use plus partitions allocated for fault tolerance) is greater than a first quantity threshold, the default threshold processing load may be set to $x+y$. When the total quantity of partitions allocated to the service is greater than a second quantity threshold, the default threshold processing load may be set to $(x+y)+z$. The process may continue until the default threshold processing load reaches a predetermined value. In some examples, the default threshold processing load may be initially set to 50%, increased to 75% when the quantity of partitions is greater than the first quantity threshold, and increased to 90%, when the quantity of partitions is greater than the second quantity threshold. The autoscaler may include any quantity of quantity thresholds and corresponding default threshold processing loads.

The default threshold processing load may be superseded by the threshold processing load generated by the machine-learning model. The machine-learning model may generate a confidence value indicative an accuracy of the corresponding threshold processing load generated by the machine-learning model. If the confidence value is greater than a threshold value, then the autoscaler may be reconfigured using the threshold processing load generated by the machine-learning model. If the confidence value is less than the threshold, then the autoscaler may use the default threshold processing load.

Alternatively (to adjusting the threshold processing value), or additionally, the autoscaler may dynamically determine the quantity of partitions that are to be instantiated each time additional processing resources are to be allocated to the service. The autoscaler may double the quantity of partitions allocated to the service the first time the additional processing resources are allocated to the service. The autoscaler may then instantiate fewer partitions during a subsequent instance in which additional processing resources are to be allocated to the service. The autoscaler may define a dynamic factor value usable to determine a quantity of partitions to instantiate when adding processing resources to the service. The factor value, f, may be a real number that when multiplied by the current total quantity of partitions allocated to the service to derive the new quantity of partitions that are to be allocated to the service. For example, x partitions may be allocated to the service (e.g., partitions allocated for use plus partitions for fault tolerance). Upon determining that additional processing resources are to be allocated to the service, the autoscaler may instantiate a quantity of partitions, y, where $y=fx-x$. The factor value, f, may be decreased based on the quantity of partitions allocated to the service.

For example, autoscaler may allocate 10 (e.g., x) partitions to a service (e.g., x=10) and set the factor value 2 (e.g., f=2). When autoscaler increases the processing resources, the autoscaler may determine the quantity of additional partitions, y, as y=fx−x=2*10−10=10. The autoscaler may then determine whether to decrease the factor value (e.g., based on whether the new quantity of partitions is greater than a quantity threshold, etc.). If so, the factor value may be decreased to, for example, 1.75. When autoscaler increases the processing resources again, the autoscaler may determine the quantity of additional partitions, y, as y=fx−x=1.75*20−20=15. The autoscaler may then determine whether to decrease the factor value (e.g., based on whether the new quantity of partitions is greater than a quantity threshold, etc.). If so, the factor value may be decreased to, for example, 1.50. The autoscaler may continue to monitor the service, increase the quantity of partitions allocated to the service, and/or decrease the factor value until the factor value reaches a predetermined minimum. The autoscaler may use the threshold processing load, the factor value, or both the threshold processing load and factor value to manage the processing resources of the service.

In an illustrative example, an autoscaler of a processing device may configured to manage processing resources of a service operating within a distributed network. The service (e.g., an application, one or more processes, one or more functions, and/or the like) may execute within a distributed network and be accessed by accessed by a set of remote client device (e.g., operated by users) through a network (e.g., wide area network, local area network, mesh network, the Internet, etc.). The autoscaler may receive historical resource allocation data associated with the particular service, other services operating within the distributed network, other services operating in other distributed services, and/or the like.

The historical resource allocation data may be used to train a machine-learning model. The machine-learning model may be trained using supervised training, unsupervised training, semi-supervised training, reinforcement training, and/or the like. The machine-learning model may be configured to generate a threshold processing load usable to determine when additional processing resources are to be allocated to the particular service. In some instances, the machine-learning model may be configured to generate one or more threshold processing loads and a corresponding one or more confidences. The threshold processing load having a highest confidence may then be output from the machine-learning model.

The autoscaler may instantiate a first set of partitions that are configured to support the particular service. Each partition may be instantiated within a processing node (e.g., a processing device, a virtual machine, etc.). A partition may be a discrete sub-environment within a larger environment configured to execute one or more processes. The partition may include one or more containers provide a runtime environment for the partition (e.g., including application programming interfaces, libraries, code, communication interfaces, etc.). In some instances, partitions may be assigned an address (e.g., Internet Protocol address, physical address, etc.) usable to connect a client device to a particular partition. A partition may execute a discrete instance of the service, a portion of the service, and/or the like.

The first set of partitions may include a first quantity of partitions configured to support the particular service. In some instances, the autoscaler may select one or more of the first set of partitions to be allocated for use by the service and one or more of the first set of partitions to be reserved for fault tolerance should one or more of the partitions fail (e.g., based on n-modular redundancy). The autoscaler may determine a quantity of partitions to allocate for use by the particular service based on a quantity of users expected to access the particular service, the quantity of processing resources allocated to the particular service, combinations thereof, or the like. In some examples, the percentage of partitions allocated for use by the particular service may be 50% with the other 50% of the first set of partitions being reserved for fault tolerance.

The autoscaler may receive a load value associated with the first set of partitions. The load value may be derived in real time and correspond to percentage of one or more processing resources consumed by the first set of partitions (and/or the particular service) relative to a quantity of processing resources allocated to the first set of partitions (and/or the particular service). For example, the load value may correspond to a percentage of the CPU consumed by the set of partitions (e.g., relative to portion of the CPU allocated to the set of partitions). The load value may correspond to a single resource (e.g., as in the preceding example) or an aggregate of the resources allocated to the set of partitions such as, but not limited to, CPU, memory (e.g., non-volatile and/or volatile memory, etc.), network bandwidth, power, and/or the like.

In some examples, the load value may be derived based on a quantity of resources consumed by the partitions of a particular processing device relative to the resources provided by that processing device. If the first set of partitions execute from within more than one processing device, than the load values of each processing device may be aggregated (e.g., summed, averaged, weighted sum based a quantity of partitions within each processing device, etc.). In other examples, the load value may correspond to a rate in which the processing resources consumption changes over time. Other such methods may be used to derive a current load of the first set of partitions and/or the particular service.

The autoscaler may execute the machine-learning model using the load value. The machine-learning model may output a threshold processing load usable to determine when to allocate additional processing resources to the particular service. The threshold processing load may be used to reconfigure the autoscaler (e.g., by replacing a default threshold processing load, a current threshold processing load, etc.). The autoscaler may continuously receive a load value associated with first set of partitions in real time. In some instances, the autoscaler may continuously execute the machine-learning model using the contemporaneously received load value (e.g., the most recent load value) such that the threshold processing load may be based on the current operating conditions of the particular service.

The autoscaler may determine whether the most recent load value is greater than the threshold processing load of the autoscaler. If the current load value is greater than the threshold processing load, then the autoscaler may determine to allocate additional processing resources to the particular service (e.g., by instantiating additional partitions for the particular service). If the current load value is less than the threshold processing load, then autoscaler may continue to monitor the resources of the particular service.

The autoscaler may instantiate, in response to determining that the current load value is greater than a threshold processing load, a second set of partitions. The second set of partitions may include a second quantity of partitions determined based on the first quantity of partitions. In some instances, the second quantity of partitions may be equal to the first quantity of partitions (e.g., doubling the total quantity of partitions instantiated for the service). Each time the autoscaler instantiates additional partitions, the quantity of the new partitions instantiated may be equal to the total quantity of partitions instantiated for the service (e.g., doubling the total quantity of partitions instantiated for the service each time).

The autoscaler may be reconfigured based on the current load value and a total quantity of partitions instantiated for the particular service (e.g., the first quantity of partitions plus the second quantity of partitions. Reconfiguring the autoscaler may include adjusting the threshold processing load and/or the factor value of the autoscaler based on having instantiated additional partitions to the particular service in response to the updated load value. Alternatively, reconfiguring the autoscaler may include modifying the machine-learning model based on having instantiated additional partitions to the particular service in response to the updated load value. For example, the machine-learning model may be modified using a reinforcement training iteration, retraining, modifying one or more internal weights, modifying one or more confidence values, generating a new machine-learning model, training a new machine-learning model, combinations thereof, or the like. In another alternative, reconfiguring the autoscaler may include generating a new load value after instantiating the second set of partitions and executing the machine-learning model using the new load value to generate an updated threshold processing load and/or factor value. The autoscaler may then be reconfigured using the updated threshold processing load and/or factor value.

FIG. 1 illustrates an example distributed network environment in which a service may be provided for access by a set of client devices according to aspects of the present disclosure. Distributed network environment 100 may include a distributed network 104 that provides services to internal devices (e.g., computing devices, databases, virtual machines, servers, etc. of the distributed network or connected to the distrusted network) and/or external devices (e.g., client devices 124-136 and/or other devices configured to connect to the distributed network through network 120, etc.). For example, the distributed network may host one or more applications accessible to client devices 123-136. The one or more applications may include web-based applications, distributed applications (e.g., that are executed by both the client device and a device of the distributed network, etc.), and applications executed by devices of the distributed network, the data of which being accessible to client devices 124-136.

Distributed network 104 may include one or more physical processing devices configured to communicate with remote devices via network 120. Each physical processing device may include processing resources that can be allocated to processes executed by the physical processing device such as central processing unit (CPU) cycles, memory (volatile and/or non-volatile memories, etc.), network bandwidth, and/or the like. Examples of physical processing devices may include, but are not limited to, servers, computing devices, mobile devices, databases, etc. In some examples, distributed network 104 may include one or more processing devices that manage operations of distributed network 104. For instance, server 116 may communicate with other devices of distributed network 104 to allocate processing resources to services, allocate additional processing resources to services that already have allocated processing resources, deallocating processing resources allocated to services, add and/or remove physical processing devices to distributed network 104, instantiating virtual environments within distributed network 104, instantiating partitions (e.g., discrete sub-environments of a physical processing device, virtual machine, and/or the like), load balancing, routing communications, etc. Alternatively, or additionally, some or all of the operations of server 116 may be performed by one or more processes executing on physical processing devices that also provide the services of the distributed network.

Distributed network 104 may instantiate one or more virtual environments within the physical processing devices to execute one or more of the services provided by distributed network 104. The virtual environments may enable distributed network 104 to encapsulate services provided to particular groups of users, secure data associated with groups of users and/or services, etc. In some examples. each processing device of the distributed network may execute one or more virtual machines. Each virtual machine may be allocated a predetermined portion of the processing resources of the processing device on which it executes. Alternatively, the processing device executing one or more virtual environments may include a hypervisor configured to dynamically manage the execution of the one or more virtual machines of the processing device including the processing resources allocated to the virtual machine. The hypervisor may be configured by another hypervisor executing on server 116 (and/or as a distributed process throughout the distributed network) that manages the hypervisors executing on the processing devices of the distributed network. The virtual environments may isolate applications and/or data executing in the distributed network, which may prevent client devices with access to one application from accessing data associated with other applications.

In some instances, each virtual machine may instantiate a set of partitions that may each execute an instance of an application, portions (e.g., processes, functions, etc.) of an application executed across multiple partitions and/or virtual machines, one or more processes or functions, and/or the like. Each partition may be allocated processing resources of the processing device. The processing resources may be a portion of the processing resources allocated to the virtual machine and/or processing resources of the processing device separate from those processing resources allocated to the virtual machine. Each partition may include a container within which the application of the partition is configured to execute. A container may include an environment enabling execution of software (e.g., including libraries, application programming interfaces, other interfaces, dependencies, etc. that establish an environment within which the software can execute). In some instances, the container may represent a virtualized environment within the virtual machine.

The containers may abstract the architecture of the virtual machine and/or the processing device to enable the application to execute regardless of what virtual machine, processing device, etc. executes the application. For example, a container may enable execution of software configured for a particular chipset architecture (e.g., x86, PowerPC, etc.), operating system, etc. The configuration of each container of a virtual machine or physical processing device may be the same or different.

Distributed network 104 may include any number of physical processing device each executing any number of virtual machines with each virtual machine including any number of partitions. In some instances, distributed network 104 may instantiate a fixed quantity of partitions for each virtual machine. If processing load of a service (e.g., aggregate processing load, average processing load, or the like of the partitions allocated to the service, etc.) is greater than or equal to a threshold load, distributed network 104 may facilitate the instantiation of additional processing resources by one or more of: allocating additional physical processing devices to the service, instantiating one or more additional virtual machines, and/or instantiating one or more additional partitions. For example, distributed network 104 may include virtual machine 1 (108) and virtual machine 2 (112) that each include a set of partitions that enable distributed network 104 to provide a service to client device 124-136 through network 120. Upon detecting that the processing load of distributed network 104 caused by the service is greater than the threshold load, distributed network 104 may instantiate a virtual machine n (114) that includes a new set of partitions. Distributed network 104 may then balance the processing load on the virtual machines using the newly instantiate virtual machine n (114).

Distributed network 104 may separate the physical process devices that provide services to a particular domain such that each physical processing device of distributed network 104 may provide services to a single domain. In those instances, a first set of processing devices may provide services to a single domain. Services provide by distributed network 104 to another domain may be provided by a second (non-overlapping) set of physical processing devices. Alternatively, or additionally, distributed network 104 may separate the virtual machines that provide services to a particular domain such that each virtual machine of distributed network 104 may provide services to a single domain. A physical processing device that executes multiple virtual machines may provide services to one or more domains with each virtual machine providing services to a single domain. Alternatively, or additionally, distributed network 104 may separate the partitions that provide services to a particular domain such that each partition of a virtual machine or physical processing device may provide services to a single domain. A virtual machine that executes multiple partitions may provide services to one or more domains with each partition providing services to a single domain. The virtual machine may secure each partition to prevent a client device from accessing a partition of a domain without authorization.

Client devices 124-136 (e.g., desktop/laptop computers, mobile devices, tablets, processing devices, etc.) may connect to distributed network 104 to access services provided by distributed network 104. In some instances, client devices 124-136 may provide access credentials (e.g., such username and/or password, access token, public/private cryptographic keys, and/or the like). Distributed network 104 may use an identification of the client device requesting access and the access credentials to grant or deny access to particular services provided by distributed network 104. For example, distributed network 104 may provide services to multiple sets of users by instantiating a set of partitions for each set of users. A first client device may transmit a request for access to first service. The request may include an identification of the first client device, an identification of the first service, and/or access credentials associated with the first client device. Distributed network 104 may authenticate the first client device based on the request and determine whether access is to be granted (or denied) to the first client device. Granting access to the services associated with the first domain may include connecting the first client device to a particular partition of distributed network 104 that corresponds to the requested service.

Figure 2:
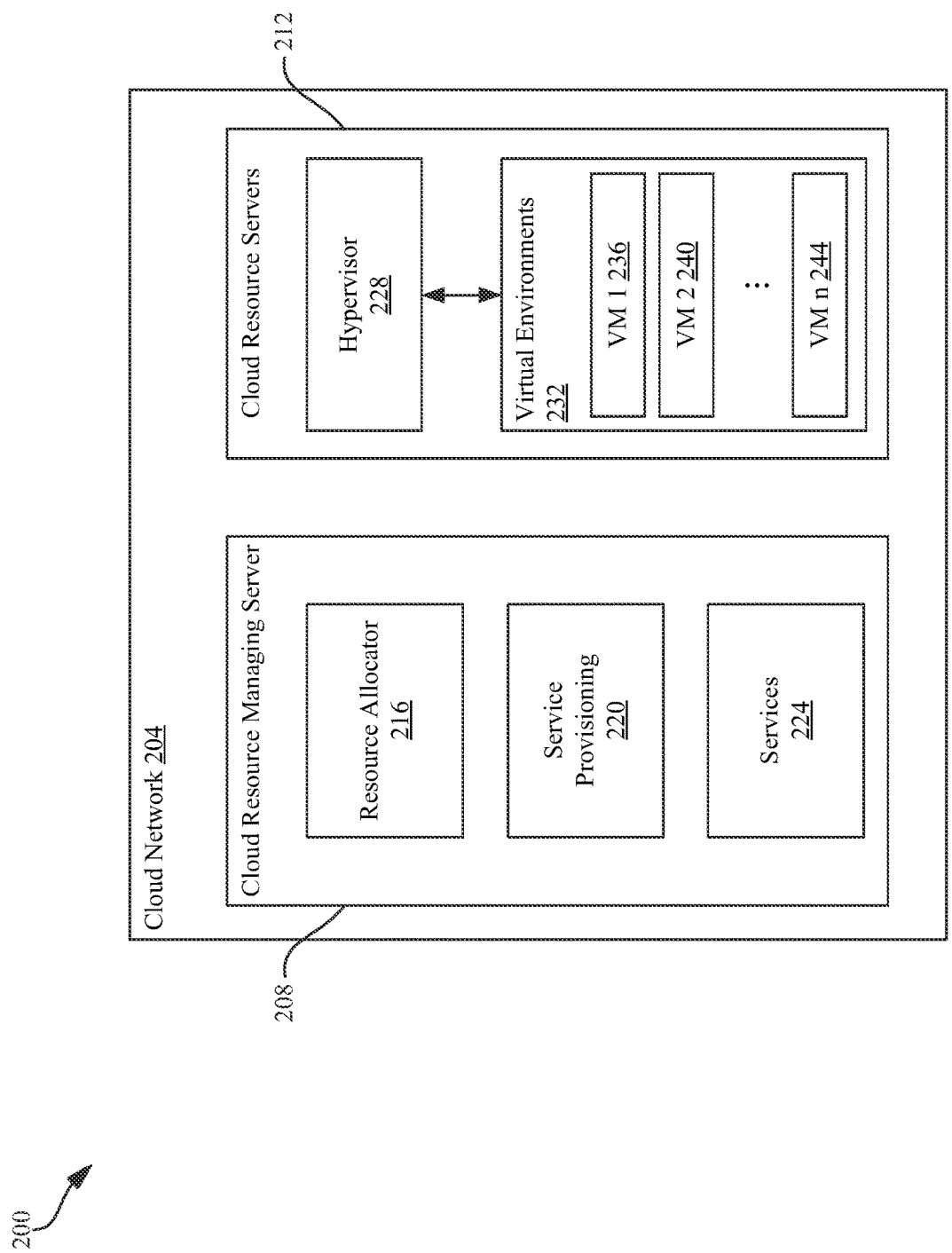
FIG. 2 illustrates an example block diagram of a cloud network configured to provide services client device devices across multiple domains according to aspects of the present disclosure.

FIG. 2 illustrates an example block diagram of a cloud network configured to provide services client device devices across multiple domains according to aspects of the present disclosure. Distributed network environment 200 may include cloud network 204 and optionally one or more other networks (e.g., such as those domains which cloud network 204 provides services, networks that provide services to cloud network 204, networks operated by client devices, other networks, and/or the like. Cloud network 204 may include one or more cloud resource managing server 208 and one or more cloud resource services 210 that enable cloud network 204 to provide services to client devices. Cloud network 204 may include also include processing devices (e.g., in addition to those shown), storage devices (e.g., such as databases, network area storage devices, non-volatile memory devices, etc.), and/or the like. Cloud network 204 (e.g., via devices therein) may communicate with remote devices through one or more communication interfaces configured to communicate via a wired or wireless connection (e.g., a direct connection between a device of cloud network 204 and the remote devices, etc.), local area networks, wide area networks, proxy networks, mesh networks, the Internet, and/or the like.

Cloud resource managing server 208 may include one or more devices configured to manage the resources of cloud network 204, services provided by cloud network 204 (e.g., by provisioning new services, removing services, modifying services, etc.), managing cloud resource servers 212 (e.g., by adding new cloud resource servers to cloud network 204, provisioning cloud resource servers, removing cloud resource servers, etc.), and/or the like. Alternatively, or additionally, the processes executed by cloud resource managing server 208 may be executed by a cloud resource server 212, a virtual environment 232 executed by a cloud resource server 212, executed as a distributed process across multiple cloud resource servers 212, executed as a distributed process across multiple virtual environments 232 (e.g., executing on a single cloud resource server 212 or executing across multiple cloud resource servers 212, etc.).

Cloud resource managing server 208 may include resource allocator 216 that manages the allocation of processing resources of cloud resource servers 212 to services provided by cloud network 204. Resource allocator 216 may include a ledger indicating a quantity of processing resources within the cloud network 204, percentage of the processing resources that are allocated, an indication of a quantity of resources allocated to each service, an indication of a quantity of resources allocated to each domain (e.g., organization to which cloud network 204 provides services, etc.), and/or the like. Resource allocator 216 may maintain the ledger in real time such that cloud resource managing server 208 may determine a state of the processing resources consumed and/or available to cloud network 204 at any instant.

When new processing resources are added to cloud network 204, the new processing device may transmit a manifest indicating the processing resources of the new processing device to devices of cloud network 204. The manifest may include both processing resources already consumed by the new processing device (e.g., by an operating system, application stored on and/or executed by the new processing device, etc.) and the processing resources that the new processing device may make available to cloud network 204. Alternatively, the manifest may include only those processing resources that may be allocated to services provided by cloud network 204. If the manifest is transmitted directly to cloud resource managing server 208, cloud resource managing server 208 may add the manifest to the ledger. If the manifest is transmitted to a processing device that is not cloud resource managing server 208, then that processing device may retransmit the manifest with an identification of the new processing device (e.g., device identifier, Internet Protocol address, media access control address, etc.) to cloud resource managing server 208.

Resource allocator 216 may receive a resource allocation request for a new service that is to be provided by cloud network 204. The resource allocation request may include an identification of the service to be provided, an identification of the quantity of processing resources requested, an identification of an expected quantity of client devices at that are to access the service, a time interval over which the processing resources are to be allocated, an indication as to whether redundancy is being requested, an identification of one or more geolocations from which the client devices are expected to access the service, and/or the like. Resource allocator 216 may then allocate a set of processing resources to the new service based on the resource allocation request and the ledger. In some instances, resource allocator 216 may query cloud resource servers 212 for a current state of the available processing resources of each cloud resource servers 212 (e.g., to ensure that the ledger is accurate and/or up-to-date, etc.).

Resource allocator 216 may transmit an identification of the allocated resources to service previsioning 220. The identification of the allocated resources may include an identification of each cloud resource server 212 from which processing resources are being allocated and an indication of a quantity of processing resources to be allocated from each identified cloud resource server 212, virtual environment 232 operating within an identified cloud resource environment (e.g., if present, etc.), and/or partition (e.g., if already instantiated), etc. Service provisioning 220 may transmit a communication to each identified cloud resource servers 212 indicating that the quantity of processing resources to be provided by that identified cloud resource servers 212 is allocated to the new service.

Resource allocator 216 may provision the service by deploying one or more virtual environment within those identified cloud resource servers 212 and/or configuring the virtual environments that are already operating within identified a cloud resource server 212. For example, resource allocator 216 may transmit a request to provision one or more virtual environments to hypervisor 228 operating on an identified cloud resource server 212. The request to provision one or more virtual environments may include configuration parameters for the virtual environment (e.g., an architecture and/or operating system environment to emulated, instruction set, allocated processors, allocated memory, network adaptors, and/or the like). Hypervisor 228 may then instantiate the requested one or more virtual environments 232 (e.g., virtual machine (VM) 1 236, VM 2 240, VM n 244, etc.) within the identified cloud resource server 212. Alternatively, if hypervisor 228 determines that a virtual environment 232 is already executing within cloud resource server 212, but not being utilized (or not being efficiently utilized), hypervisor 228 may offload the workload of that virtual environment 232 to another virtual environment (e.g., operating on a same cloud resource server 212 or another cloud resource server 212, etc.), and reconfigure the virtual environment 232 according to the request by resource allocator 216.

Resource allocator 216 may then cause each configured virtual machine to instantiate a set of partitions. Each partition may be instantiated with one or more containers that enable the execution of the service. For example, the container may include one or more packages (e.g., application programming interfaces, libraries, compilers, etc.) that usable by the service to execute within the container. Each container may include an address that may be used to connect to the container and access the service. The address may be transmitted to a client device (and/or stored by cloud resource managing server 208), enabling the client device to connect to a particular container of cloud resource servers 212 and access the service.

In some instances, the quantity of partitions instantiated may be approximately equal to an expected quantity of client devices that are to access the service at a same time. In other instances, the quantity of partitions instantiated may be approximately double to an expected quantity of client devices that are to access the service at a same time. By instantiating twice as many partitions, one or more partitions may fail (e.g., due to software and/or hardware faults, communication interface errors, etc.) without impacting a quality of the new service. Instead, when a partition fails, the client devices connected to that partition may be automatically connected to a new partition. The failed partition may be removed, and a new partition may be instantiated to preserve the quantity of extra petitions available.

Service provisioning 220 may then provision each partition with the new service from services 224. The service may include an application, a portion of an application (e.g., one or more functions, processes, etc.), one or more software packages, one or more functions, and/or the like. The service may execute within a single partition or across multiple (e.g., some or all) partitions.

In some instances, additional client devices may request access to the service increasing a processing load of the service. Resource allocator 216 may include an autoscaler that may automatically (or subject to user intervention) allocate additional processing resources to the service upon detecting a particular processing load. For example, if the processing load of the service (e.g., a percentage of processing resources consumed by the service relative to a total quantity of processing resources allocated, a percentage of processing resources consumed by cloud network 204 relative to a total quantity of processing resources of cloud network 204, a percentage of partitions providing access to the resource relative to a total quantity of partition instantiated, and/or the like) is greater than 50%, then the autoscaler increase processing resources allocated to the service. Alternatively, a high processing load may cause a component of cloud network (e.g., cloud resource servers 212, resource allocator 216, one or more client devices, an administrator, and/or the like) may request additional resources be allocated to the service.

The request may include one or more parameters such as, but not limited to, a quantity of additional processing resources requested, a geographic location in which client devices are expected to be accessing the service, a time interval over which the additional processing resources may be needed, and/or the like. Resource allocator 216 may identify one or more cloud resource servers 212 capable of providing the requested additional processing resources. The one or more cloud resource servers 212 may be servers that have already allocated processing resources to the service and which may already have virtual environments configured for use by the service, one or more cloud resource servers 212 that have not yet provided processing resources to the service, a combination thereof, etc.

The autoscaler may double a quantity of processing resources allocated to the service. For example, resource allocator 216 may cause a new set of partitions to be instantiated. The quantity of the new set of partitions may be equal to the quantity of partitions currently executing for the service. Alternatively, resource allocator 216 may store a factor value that may be used to determine a quantity of new partitions to instantiate by multiplying the factor value by the current quantity of partitions executing for the service. The autoscaler may decrease the factor value each time processing resources are added to the service. For example, the factor value may be initially set to 2 and decrease by a predetermined quantity following a first instance in which processing resources are added to the service.

In some instances, the autoscaler may modify the processing load that may cause a subsequent increase in the processing resource to be allocated. Modifying the processing load threshold may reduce a likelihood that a service will allocate further processing resources. For example, the processing load that may cause a first increase in a processing resources may be set to 50% (e.g., of CPU utilization). The processing load threshold may then be increased to 75%. The autoscaler may combine increasing the processing load threshold with decreasing the factor value to adjust when and how additional resources can be allocated to the service.

Alternatively, or additionally the autoscaler may use one or more machine-learning models to determine when or how to increase processing resources to the service. The machine-learning models may be neural networks (e.g., such as a deep neural network, convolutional neural network, recurrent neural network, etc.), support vector machines, decision trees, combinations thereof, or the like. The machine-learning models may be trained using data derived from historical operations of cloud network 204, procedurally generated data, manually generated data, combinations thereof, or the like. The machine-learning models may predict an instance in which additional processing resources may be needed by the service such as when the service is under a high processing load or when a high processing load is predicted to occur. The machine-learning models may also predict a quantity of additional processing resources that should be allocated to the service (e.g., a quantity of additional partitions, a quantity of additional CPU capacity, memory capacity, network bandwidth capacity, and/or the like). The autoscaler may receive the output from the machine-learning models and determine whether to increase the processing resources allocated to the service and/or an amount of additional processing resources to allocate.

Figure 3:
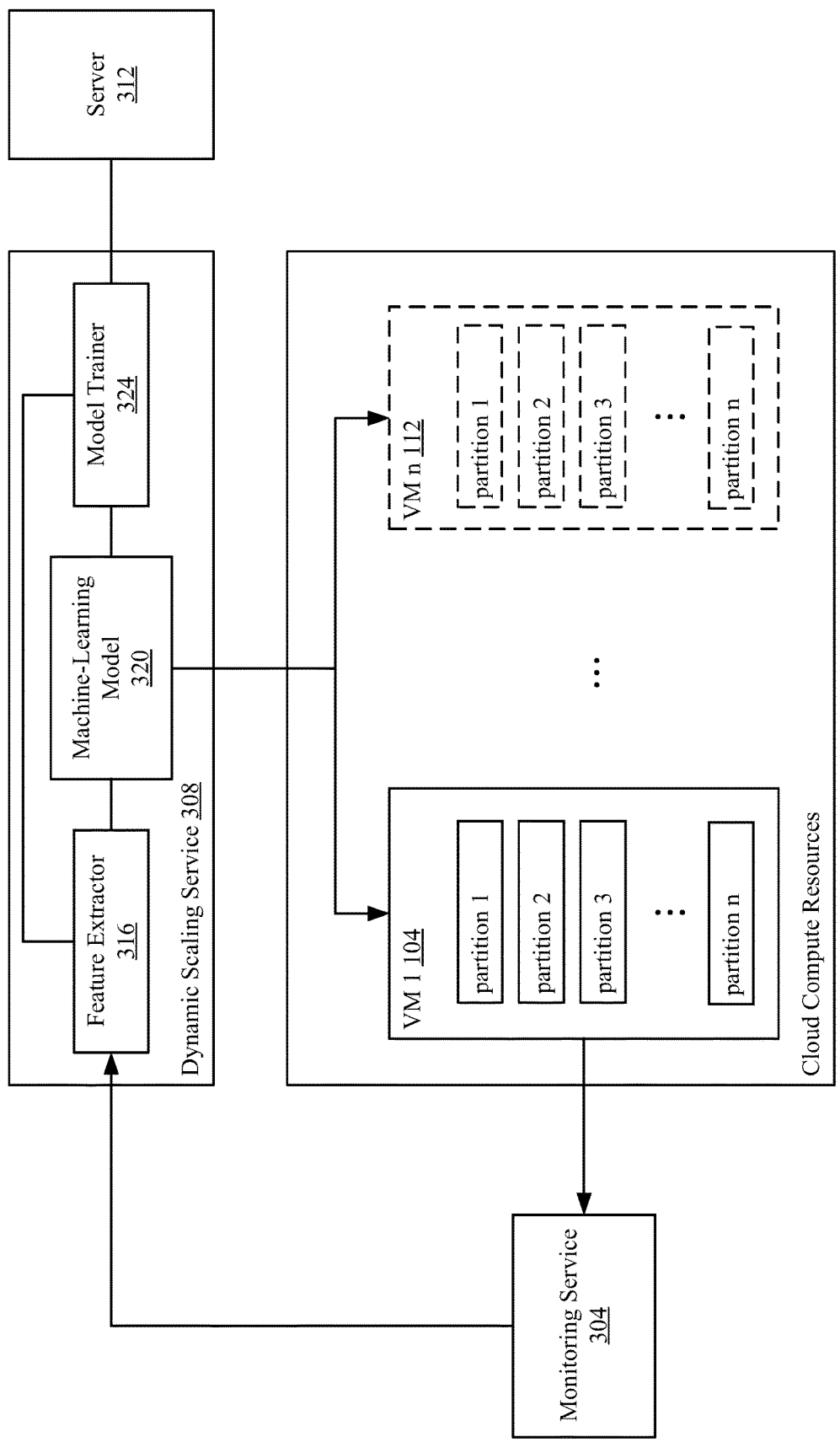
FIG. 3 illustrates an example block diagram of an autoscaler that monitors processing resources consumed by services of a distributed network in real time and dynamically allocates processing based on the real time status of the distributed network according to aspects of the present disclosure.

FIG. 3 illustrates an example block diagram of an autoscaler that monitors processing resources consumed by services of a distributed network in real time and dynamically allocates processing based on the real time status of the distributed network according to aspects of the present disclosure. Autoscaler 300 may be deployed within a distributed network (e.g., such as distributed network 104 of FIG. 1, cloud network 204, of FIG. 2, etc.) to dynamically adjust processing resources allocated to an application deployed within the distributed network. Processing resources may correspond to resources of a physical processing device that can be used to execute services such as, but not limited to CPU cycles, memory (e.g., volatile or non-volatile memories, etc.), network bandwidth, and/or the like. For example, the distributed network may include a first virtual machine (e.g., VM 1104) that includes a first set of partitions configured to provide processing resources to the application. A predetermined quantity of processing resources may be allocated to each partition and each partition may execute an instance of the application, one or more processes of the application (e.g., such that the application may be configured for distributed execution across one or more partitions), one or more functions associated with the application, etc.

Autoscaler 300 may include monitoring service 304 that monitors and stores a state of the application in real-time. Monitoring service 304 may also monitor a state of other applications and/or services provided by the distributed network. The state may include a total quantity of processing resource allocated to the application, a percentage of the processing resources consumed by the application relative to the total quantity of processing resource allocated to the application, a quantity of partitions accessed by client devices, a rate in which the total quantity of processing resources consumed by the application or the percentage of processing resources consumed by the application changes over time, a quantity of partitions reserved for fault tolerance, a total quantity of partitions allocated to the application, a quantity of client devices accessing the application and/or a partition allocated to the application, a status of the total quantity of partitions allocated to the application, a status of the virtual machines allocated to the application, a status of the processing devices allocated to the application, combinations thereof, or the like.

In some examples, monitor service 304 may monitor a state of processing resources, processing devices, virtual machines, partitions, etc. allocated to the application and transmit communications to dynamic scaling service 308 with an indication of any changes to the state of processing resources, processing devices, virtual machines, partitions, etc. For example, if additional partitions are instantiated and/or allocated to the application, monitoring service 304 may detect the new partitions or that the total quantity of partitions allocated to the application has changed. Monitoring service 304 may then transmit a communication to dynamic scaling service 308 with an indication of the change. Alternatively, monitor service 304 may stream a current state to dynamic scaling service 308 in real time such that dynamic scaling service 308 may include a contemporaneously derived state of the processing resources, processing devices, virtual machines, partitions, etc.

Dynamic scaling service 308 may receive the status of the application and/or the distributed network from monitoring service 304 to determine when additional resources should be allocated to the application (or deallocated from the application) and a quantity of resources that are to be allocated (or deallocated). In some instances, dynamic scaling service 308 may include one or more thresholds usable to determine when to allocate (or deallocate) additional processing resource to the application. The threshold may be statically or dynamically defined based on, for example, a predetermined value, a current quantity of resources consumed, a current quantity of resources allocated to the application, a current quantity of partitions instantiated for the application, a current quantity of partitions in use by the application, a current quantity of partitions reserved for fault tolerance, user input, a current performance of the application, combinations thereof, or the like. Dynamic scaling service 308 may determine that the current status of the application (e.g., such as a processing load indicative of a percentage of an allocated processing resource that is currently consumed by the application) is greater than a first threshold, and in response, allocate additional processing resources to the application.

In some instances, dynamic scaling service 308 may include one or more machine-learning models 320 trained to efficiently allocate additional processing resources to the application. Machine-learning models 320 may output an indication that additional processing resources are to be allocated to the application and a quantity of additional resource that are to be allocated. In some examples, machine-learning models 320 may include neural networks, support vector machines (SVM), K-Nearest Neighbors, Naive Bayes Classifier, decision trees, perceptrons, logistic regression, and/or, the like. Machine-learning models 320 may be trained using historical data, manually generated data, procedurally generated data, and/or the like. The training data may be received and/or derived from data of the distributed network and/or from server 312.

Server 312 may store data of the distributed network configured for training machine-learning models 320, data validation (e.g., to confirm the application and/or any data thereof has not been tampered with or corrupted, etc.), fault tolerance (e.g., root cause analysis, fault mitigation, etc.), and/or the like. Server 312 may also receive data from other networks and/or devices such as other distributed networks, client devices (e.g., client devices 124-136 or other client devices), and/or the like. Server 312 may be a processing device of the distributed network or a device that is independent from distributed network (e.g., such as a device configured to provide persistent data storage, etc.).

Server 312 may transmit the data to model trainer 324 of dynamic scaling service 308. Model trainer 324 may define set of training datasets configured to train a machine-learning model of machine-learning models 320. The training datasets may be configured to train the machine-learning model to generate a particular output (e.g., an indication that processing resources are to be increased and/or a quantity of additional processing resources that should be allocated, etc.). The training datasets may be passed to feature extractor 316. Feature extractor 316 may derive a set of features from each training dataset that may passed as input into machine-learning models 320. In some instances, the set of features may be a feature vector (e.g., in which each data value is associated with a dimension such as time, etc.). The set of features derived from the set of datasets may be used to train machine-learning models 320.

Machine-learning models 320 may be trained using supervised or unsupervised learning. For supervised learning, each set of features may include one or more features indicative of a label that corresponds to an expected output from machine-learning models 320. For example, a set of features used to train a machine-learning model training to indicate that additional processing resources are to be allocated to the application may include a label of "allocate" (e.g., indicating that the machine-learning model should output an indication that additional resources should be allocated to the application given the set of features), a label of "neural" (e.g., indicating that the machine-learning model should output an indication that additional resources should not be allocated to the application given the set of features), a label of "deallocate" (e.g., indicating that the machine-learning model should output an indication that resources should deallocated from the application given the set of features), etc.

Labels may be derived manually and/or automatically. For example, when using historical data, the label may be derived from whether additional resources were or were not allocated to the application given the status of the application and/or distributed network in the historical data from which the set of features were derived. In some instances, the set of features may be augmented to include a particular label that is different from the label derived from the corresponding historical data. For example, the historical data used to derive a set of features may indicate that additional processing resources were not allocated, but upon further review, should have been allocated. The set of features derived from that historical data may be modified to include a label indicating that additional resources were allocated. The set of features may be modified automatically (e.g., through an evaluation of the historical data, an evaluation of the application and/or distributed network that occurred after the historical data, etc.) or from user input. Labels may also be generated procedurally (e.g., for procedurally generated training data) and/or from user input.

Machine-learning models 320 may also be training using unsupervised learning (e.g., in addition to supervised learning or in place of supervised learning). In unsupervised learning, machine-learning models 320 may use sets of features to derive relationships between features derived from the distributed network, application, virtual machines, partitions, events detected during execution (e.g., such as, but not limited to, system faults, partition failure, increases in processing resources, increases in processing loads, etc.), and/or the like.

The output from machine-learning models 320 during training may be evaluated by model trainer 324. Model trainer 324 may evaluate machine-learning models 320 during each iteration of training using one or more metrics. Examples of such metrics include, but are not limited to, accuracy, precision, recall, precision-recall curve, F1 score, receiver operating characteristic (ROC), confusion matrix, combinations thereof, or the like. Model trainer 324 may compare one or more of the metrics to a corresponding one or more thresholds to determine if machine-learning models 320 have been sufficiently trained. If the one or metrics, compared to the corresponding one or more thresholds, indicate that the machine-learning model includes a particular accuracy, precision, etc., then the model trainer 324 may indicate that the machine-learning model is trained and ready for use. If not, model trainer 324 may pass another training dataset to feature extractor 316 to begin another training iteration.

In some examples, machine-learning models 320 may be persistently trained while in use using reinforcement learning. In those examples, an output from machine-learning models may be evaluated by an administrator, client devices accessing the application, from data generated by the monitoring service 304, combinations thereof, or the like. The evaluation of the output and the output itself may be passed to feature extractor 316. Feature extractor 316 may generate a set of features that may be used by the machine-learning model 420 during a reinforcement training iteration. The reinforcement training iteration may occur between executions of machine-learning models 320. In some instances, a reinforcement training iteration may occur each time machine-learning models 320 generates an output. In other instances, a reinforcement training iteration may be performed based on a particular output from the machine-learning model (e.g., such as those outputs indicating additional processing resources are to be allocated to the application, those outputs in which the data may be suitable for reinforcement learning, those outputs selected by server 312, those outputs selected by user input, etc.).

Once trained, machine-learning models 320 may be used to manage the processing resources of the application. Data from monitoring service 304, the application, the distributed network, server 312, and/or from other sources may be passed to feature extractor 316. Feature extractor 316 may then generate a set of features usable by machine-learning models 320. Examples of features that may be included in the set of features include, but are not limited to, current processing load, historical processing load, time of year, total quantity of partitions instantiated for the application, quantity of partitions in use by the application or service, historical faults and/or partition failures, application or service type, relationship with autoscaler for dependent application, and the like.

Machine-learning models 320 may be configured to output one or more target processing loads of the application and one or more corresponding confidence values. Dynamic scaling service 308 may then select the target processing load having a highest confidence. The selected target processing load may be used to modify a current configuration of the autoscaler (e.g., threshold processing load, etc.) or may be used to automatically determine if additional processing resources are to be allocated to the application. For example, if the threshold processing load is different from the selected target processing load, then the threshold processing load may be set to the selected target processing load.

Dynamic scaling service 308 may determine to replace the selected target processing load with a different value or determine to maintain the current value of the current threshold processing load. For example, the threshold processing load used by dynamic scaling service may be dynamically adjusted based on a current quantity of partitions allocated to the application. In some examples, the threshold processing load may be 50% when there are 0-10 partitions, 75% when there are 11-50 partitions, and 90% when there are greater than 50 partitions. If the confidence value of the selected target processing load generated by machine-learning models 320 is greater than a threshold confidence, then the current value of the threshold processing load may be replaced with the value of the selected target processing load generated by machine-learning models 320. If the confidence value of the selected target processing load generated by machine-learning models 320 is less than the threshold confidence, then the current value of the threshold processing load may remain unchanged.

Dynamic scaling service 308 may determine if the current processing load (e.g., from monitoring service 304) is greater than the threshold processing load. Upon determining that the current processing load is greater than the threshold processing load, dynamic scaling service 308 may allocate additional processing resources to the application by instantiating additional partitions and allocating the additional partitions to the application. For example, VM 1 104 may include a first set of partitions (e.g., partition 1-partition n) that may be allocated to an application. In response to determining that additional processing resources are to be allocated to the application, dynamic scaling service 308 may instantiate a set of partitions (e.g., partition 1-partition n of VM n 114). The new partitions can be instantiated within a virtual machine that already has instantiated partitions allocated to the application (e.g., such as VM 1104), within a new virtual machine that will manage one or more partitions (e.g., such as VM n 114), provisioning one or more processing devices (e.g., with virtual environments and/or partitions), and/or the like.

Data from each execution of machine-learning models 320 and/or the result of executing machine-learning models 320 on dynamic scaling service 308 may be used for future training purposes (e.g., training new machine-learning models, retraining machine-learning models 320, reinforcement learning as previously described, and/or the like). For example, the data can include, but is not limited to, the output from machine-learning models 320 during a particular execution, the set of features passed as input into machine-learning models 320 to generate that output, the selected target processing load, changes any changes in the processing resources allocated to the application, and/or any other data generated or derived from execution of machine learning models 320 or the distributed network. The data may be passed to model trainer 324 for use in further training of machine-learning models 320

In some examples, dynamic scaling service 308 may define a factor value usable to determine a quantity of additional partitions to instantiate when allocating additional processing resources to the application. In some instances, the factor value that may be applied to the current quantity of partitions allocated to the application to determine the quantity of partitions to include in the new set of partitions. In some instances, the factor value may be based on a current quantity of partitions available to the application. For example, when 0-10 partitions have been instantiated for the application, the factor value may be set to 2 such that when additional processing resources are allocated to the application, the quantity of partitions allocated to the application may double. When 10-50 partitions have been instantiated for the application, the factor value may be set to 1.75 such that fewer additional partitions may be instantiated in response to a greater quantity of partitions already being allocated to the application. When 51 or more partitions have been instantiated for the application, the factor value may be set to 1.5.

In other instances, machine-learning models 320 may be configured to generate the factor value based the current quantity of partitions and/or any of the previously described features or data. In those instances, machine-learning models 320 may output one or more factor values with a corresponding one or more confidences. Dynamic scaling service 308 may select the factor value of the one or more factor values that has the highest confidence. In some examples, dynamic scaling service 308 may use both the factor value generated by machine-learning models 320 and the factor value defined by dynamic scaling service 308. In those examples, if the confidence value of the factor value selected by machine-learning model 320 is greater than a threshold confidence, then dynamic scaling service 308 may use the selected factor value generated by machine-learning model 320. If the confidence value of the factor value selected by the machine-learning model 320 is less than a threshold confidence, then dynamic scaling service 308 may use the factor value defined by dynamic scaling service 308 (as previously described).

The components of autoscaler 300 (e.g., monitoring service 304, dynamic scaling service 308), may operate within an environment that manages the resources of the distributed network such as, but not limited to, cloud resource managing service 208 of FIG. 2. Alternatively, autoscaler 300 may operate as a distributed set of processes that execute across multiple devices. In those instances, autoscaler 300 may include one or more monitoring services 304. Each monitoring service 304 may monitor the status of one or more processing devices, virtual machines, and/or partitions.

Figure 4:
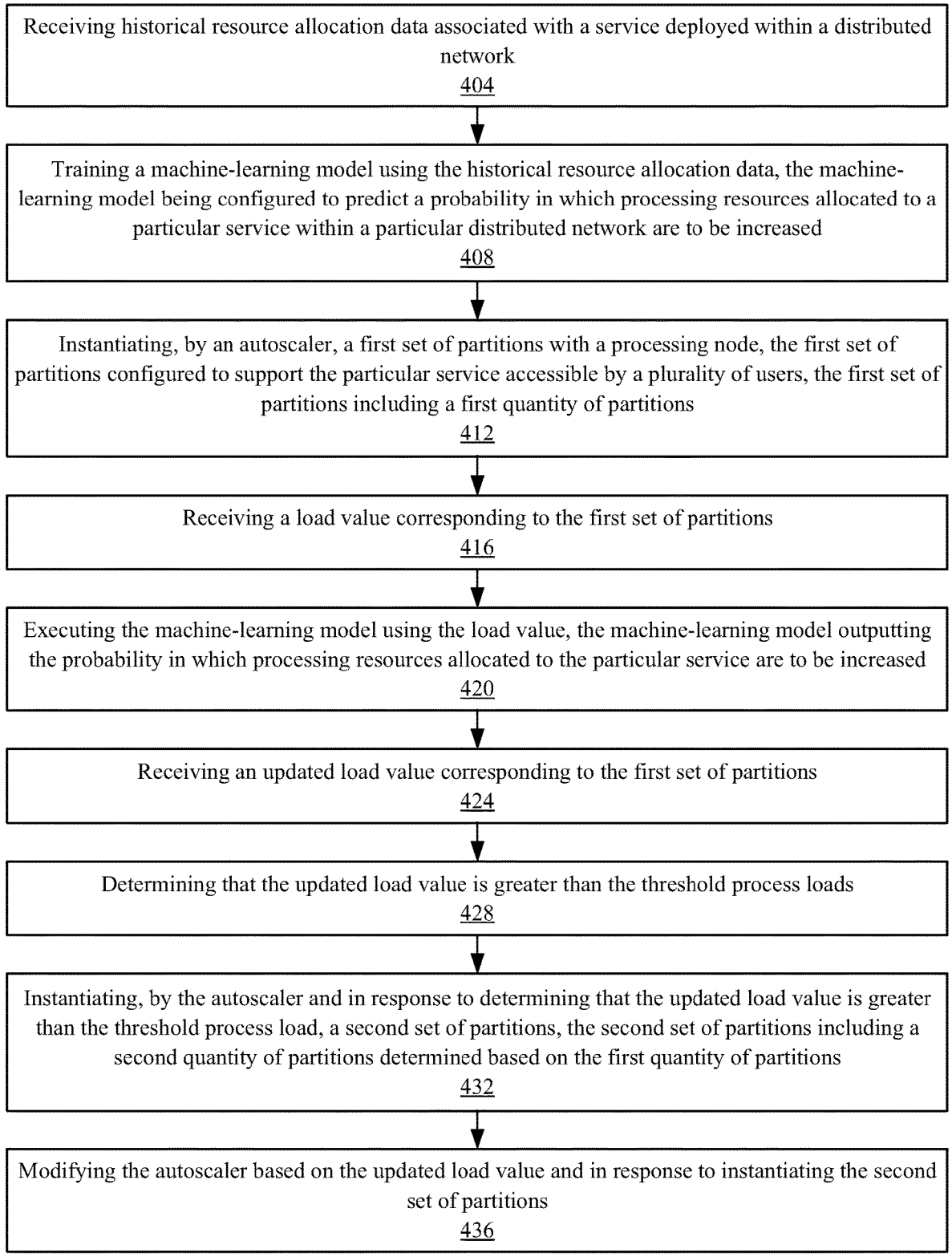
FIG. 4 illustrates a flowchart of an example process for a dynamic autoscaler configured to adjust processing resources allocated to applications according to according to aspects of the present disclosure.

FIG. 4 illustrates a flowchart of an example process for a dynamic autoscaler configured to adjust processing resources allocated to applications according to according to aspects of the present disclosure. At block 404, an autoscaler may receive historical resource allocation data associated with a particular service deployed within a distributed network. The autoscaler may be a component of a processing node (e.g., a processing device, server such a cloud resource server 212 of FIG. 2, a virtual machine executing within a processing device, or the like that is configured to provide access to applications and/or services) operating within the distributed network. The autoscaler may execute one or more operations configured to manage resources and/or services of the distributed network. The historical resource allocation data may correspond to data generated or derived from similar services to the particular service or historical data generated or derived from the particular service.

At block 408, a machine-learning model may be trained using the historical resource allocation data. The machine-learning model may be trained using supervised training, unsupervised training, semi-supervised training, reinforcement training, and/or the like as previously described in connection with machine-learning models 320 of FIG. 3. The machine-learning model may be configured to generate a threshold processing load usable to determine when additional processing resources are to be allocated to the particular service. In some instances, the machine-learning model may be configured to generate one or more threshold processing loads and a corresponding one or more confidences. The threshold processing load having a highest confidence may then be output from the machine-learning model.

At block 412, a processing device (and/or the autoscaler) may instantiate a first set of partitions that are configured to support the particular service. The processing device may facilitate the instantiation of the first set of partitions by transmitting a request to the processing node. The request may include an identification of a quantity of partitions to instantiate, a configuration of each partition to be instantiated, an indication of whether the partitions are to be instantiated within the processing node or a virtual environment of the processing node, a configuration of the virtual machine if the partitions are to be instantiated with a virtual machine, and/or the like. In some instances, the request may be transmitted to a hypervisor operating on the processing device. Alternatively, the processing device may instantiate the first set of partitions.

The first set of partitions may include a first quantity of partitions configured to support the particular service. The particular service may be accessible by a plurality of users (e.g., via client devices operated by the plurality of users, etc.). In some instances, the autoscaler may select one or more of the first set of partitions to be allocated for use by the service and one or more of the first set of partitions to be reserved for fault tolerance should one or more of the partitions fail (e.g., based on n-modular redundancy). The autoscaler may determine a quantity of partitions to allocate for use by the particular service based on a quantity of users expected to access the particular service, the quantity of processing resources allocated to the particular service, combinations thereof, or the like. In some examples, the percentage of partitions allocated for use by the particular service may be 50% with the other 50% of the first set of partitions being reserved for fault tolerance.

The autoscaler may dynamically adjust the percentage of partitions allocated for use by the particular service based on changes in the processing load of the particular service. For instance, the percentage of partitions allocated to the service may be initially set to 50%. As the autoscaler instantiates additional partitions for the service, the percentage of partitions allocated to the service may be increased. Since increasing the quantity of partitions may not increase the likelihood of partition failure, as the quantity of partitions increase the autoscaler can reduce the quantity of partitions held in reserve.

In other instances, the first set of partitions may be entirely allocated to the service. In those instances, the autoscaler may be configured to automatically (e.g., without user intervention) allocate additional partitions upon detecting a failed partition. The quantity of additional partitions instantiated may be equal to or greater than the quantity of failed partitions. The processing device may reserve processing resources, processing nodes, etc. for the allocation of additional resources when needed. The autoscaler may automatically instantiate new partitions in real-time or near real time to reduce an impact of the failed partition on the performance of the service.

At block 416, the autoscaler may receive a load value associated with the first set of partitions. The load value may be derived in real time and correspond to percentage of one or more processing resources consumed by the first set of partitions (and/or the particular service) relative to a quantity of processing resources allocated to the first set of partitions (and/or the particular service). For example, the load value may correspond to a percentage of the CPU consumed by the set of partitions (e.g., relative to portion of the CPU allocated to the set of partitions). The load value may correspond to a single resource (e.g., as in the preceding example) or an aggregate of the resources allocated to the set of partitions such as, but not limited to, CPU, memory (e.g., non-volatile and/or volatile memory, etc.), network bandwidth, power, and/or the like.

Alternatively, the load value may be derived based on a quantity of resources consumed by the partitions of a particular processing device relative to the resources provided by that processing device. If the first set of partitions execute from within more than one processing device, than the load values of each processing device may be aggregated (e.g., summed, averaged, weighted sum based a quantity of partitions within each processing device, etc.). In another alternative, the load value may correspond to a rate in which the processing resources consumption changes over time. Other such methods may be used to derive a current load of the first set of partitions and/or the particular service, provided the load value is derived in real time or near real time and is reflective of a current state of the processing resources in use by the first set of partitions or the particular service.

At block 420, the processing device may execute the machine-learning model using the load value. The machine-learning model may output a threshold processing load usable to determine when to allocate additional processing resources to the particular service. The threshold processing load may be used to reconfigure the autoscaler (e.g., by replacing a default threshold processing load, a current threshold processing load, etc.). Once reconfigured, the autoscaler may determine if the load value is greater than the threshold processing load generated by the machine-learning model. If so, the then the autoscaler may allocate additional processing resources to the particular service. If the load value is less than the threshold processing load, then the autoscaler may not allocate additional resources to the particular service. The autoscaler may continue to monitor the load value as it changes over time. Alternatively, or additionally, the machine-learning model may be continuously executed (using a contemporaneously defined load value) to continuously determine whether the autoscaler should be reconfigured.

In some instances, the autoscaler may include a dynamically defined default threshold processing load defined based on the load value, the quantity of partitions instantiated for the service (e.g., those in use by the service and those reserved for fault tolerance or only those in use by the service), the quantity of client devices currently accessing the service, an expected quantity of client devices that will access the service with a predetermined time interval, a load value of the other processing devices in the distributed network, time of day, time of year, and/or the like. For example, when the quantity of partitions instantiated for the service is between 0-(x), the autoscaler may set the threshold to 50%; when the quantity of partitions instantiated for the service is between (x+1)-(y), the autoscaler may set the threshold to 75%; and when the quantity of partitions instantiated for the service is greater than (y+1), then the autoscaler may set the threshold to 95%. The values for x and y and the particular threshold processing loads may be predetermined, defined by user input, defined by the autoscaler and/or the processing device, defined based on historical data derived from the service, an output from the machine-learning models described herein, based on a current or expected processing load, based on a quantity of resources allocated to the service, based on a total quantity of available processing resources that can be allocated to the service, and/or the like.

The machine-learning model may generate one or more threshold processing loads and a corresponding one or more confidences (indicative of an accuracy of the machine-learning model in generating a corresponding threshold processing load. The autoscaler may select the threshold processing load with the highest confidence to be the threshold processing load used to reconfigure the autoscaler. If the confidence value of the selected threshold processing load is less than a threshold confidence, then the autoscaler may continue to use the default threshold processing load. If the confidence of the selected threshold processing load is greater than then the threshold confidence, then the autoscaler may be reconfigured using the selected threshold processing load.

At block 424, the autoscaler may receive a load value associated with the first set of partitions. The updated load value may correspond to a current state of the processing resources in use by the particular service.

At block 428, the autoscaler may determine that the updated load value is greater than the threshold processing load of the autoscaler.

At block 432, the autoscaler may instantiate, in response to determining that the updated load value is greater than a threshold processing load, a second set of partitions. The second set of partitions may include a second quantity of partitions determined based on the first quantity of partitions. In some instances, the second quantity of partitions may be equal to the first quantity of partitions (e.g., doubling the total quantity of partitions instantiated for the service). Each time the autoscaler instantiates additional partitions, the quantity of the new partitions instantiated may be equal to the total quantity of partitions instantiated for the service (e.g., doubling the total quantity of partitions instantiated for the service each time).

In other instances, the machine-learning model may be used to generate a factor value usable to determine the quantity of partitions to be including in the second set of partitions. In some examples, the factor value may be multiplied by the first quantity of partitions to determine a total quantity of partitions that are to be provided to the service after instantiating the second set of partitions (e.g., the first set of partitions plus the second set of partitions). The second quantity of partitions may be determined by subtracting the first quantity of partitions from the total quantity of partitions. In other examples, the factor value may be multiplied by the first quantity of partitions to determine the second quantity of partitions. In still yet other examples, the factor value may be equal to the second quantity of partitions.

In still yet other instances, the autoscaler may include a dynamically defined default factor value that may be used to determine a total quantity of partitions that are to be provided to the service after instantiating the second set of partitions (e.g., the first set of partitions plus the second set of partitions). The default factor value may be defined based on the load value, the quantity of partitions instantiated for the service (e.g., those in use by the service and those reserved for fault tolerance or only those in use by the service), the quantity of client devices currently accessing the service, an expected quantity of client devices that will access the service with a predetermined time interval, a load value of the other processing devices in the distributed network, time of day, time of year, and/or the like. For example, when the quantity of partitions instantiated for the service is between 0-(x), the factor value may be set to 2 (e.g., such that after the second set of partitions are instantiated the total quantity of partitions will be equal to two times the first quantity of partitions) causing the second quantity of partitions to be equal to the first quantity partitions. When the quantity of partitions instantiated for the service is between (x+1)-(y), the factor value may be 1.75. When the quantity of partitions instantiated for the service is greater than (y+1), the factor value may be 1.5. The values for x and y and the particular factor values may be predetermined, defined by user input, defined by the autoscaler and/or the processing device, defined based on historical data derived from the service, an output from the machine-learning models described herein, based on a current or expected processing load, based on a quantity of resources allocated to the service, based on a total quantity of available processing resources that can be allocated to the service, and/or the like.

The autoscaler may determine whether to use the factor value generated by the machine-learning model or the default factor value. The machine-learning model may generate a load value and a corresponding confidence value. If the confidence value is greater than a confidence threshold, then the autoscaler may be reconfigured using the load value (in place of the default load value). If the confidence value is less than the confidence threshold, then the autoscaler may use the default factor value as previously described.

At block 436, the autoscaler may be reconfigured based on the updated load value and a total quantity of partitions instantiated for the particular service (e.g., the first quantity of partitions plus the second quantity of partitions. Reconfiguring the autoscaler may include adjusting the threshold processing load and/or the factor value of the autoscaler based on having instantiated additional partitions to the particular service in response to the updated load value. Alternatively, reconfiguring the autoscaler may include modifying the machine-learning model based on having instantiated additional partitions to the particular service in response to the updated load value. For example, the machine-learning model may be modified using a reinforcement training iteration, retraining, modifying one or more internal weights, modifying one or more confidence values, generating a new machine-learning model, training a new machine-learning model, combinations thereof, or the like. In another alternative, reconfiguring the autoscaler may include generating a new load value after instantiating the second set of partitions and executing the machine-learning model using the new load value to generate an updated threshold processing load and/or factor value. The autoscaler may then be reconfigured using the updated threshold processing load and/or factor value.

Figure 5:
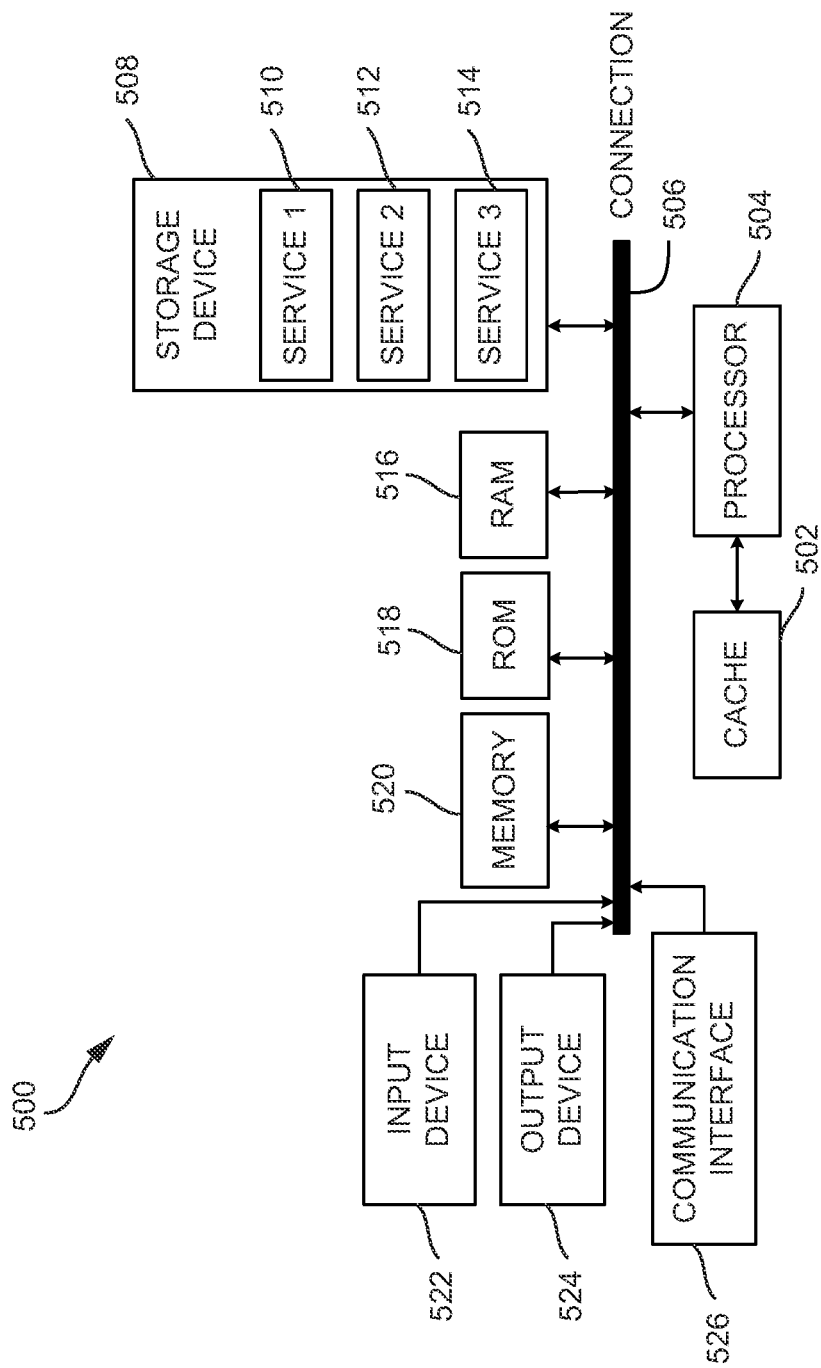
FIG. 5 illustrates an example computing device architecture of a computing device that can implement the various techniques described herein according to aspects of the present disclosure.

FIG. 5 illustrates an example computing system architecture including various components in electrical communication with each other and configured to implement aspects of the present disclosure. FIG. 5 illustrates a computing system architecture 500 including various components in electrical communication with each other using a connection 506, such as a bus, in accordance with some implementations. Example system architecture 500 includes a processing unit (CPU or processor) 504 and a system connection 506 that couples various system components including the system memory 520, such as ROM 518 and RAM 516, to the processor 504. The system architecture 500 can include a cache 502 of high-speed memory connected directly with, in close proximity to, or integrated as part of the processor 504. The system architecture 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions.

Other system memory 520 may be available for use as well. The memory 520 can include multiple different types of memory with different performance characteristics. The processor 504 can include any general-purpose processor and a hardware or software service, such as service 1 510, service 2 512, and service 3 514 stored in storage device 508, configured to control the processor 504 as well as a special-purpose processor where software instructions are incorporated into the actual processor design. The processor 504 may be a completely self-contained computing system, containing multiple cores or processors, a bus, memory controller, cache, etc. A multi-core processor may be symmetric or asymmetric.

To enable user interaction with the computing system architecture 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing system architecture 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, RAMs 516, ROM 518, and hybrids thereof.

The storage device 508 can include services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

The disclosed system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The following examples describe various example implementations of the descriptions described herein. Any reference to a series of examples is to be understood as a reference to each of those examples disjunctively (e.g., "Examples 1-4" is to be understood as "Examples 1, 2, 3, or 4").

Example 1 is a method comprising: receiving historical resource allocation data associated with a service deployed within a distributed network; training a machine-learning model using the historical resource allocation data, the machine-learning model being configured to generate a threshold processing load usable to determine when processing resources allocated to a particular service within a particular distributed network are to be increased; instantiating, by an autoscaler, a first set of partitions with a processing node, the first set of partitions configured to support the particular service accessible by a plurality of users, the first set of partitions including a first quantity of partitions; receiving a load value corresponding to the first set of partitions; executing the machine-learning model using the load value, the machine-learning model generating a threshold processing load; receiving an updated load value corresponding to the first set of partitions; determining that the updated load value is greater than the threshold process load; instantiating, by the autoscaler and in response to determining that the updated load value is greater than the threshold process load, a second set of partitions, the second set of partitions including a second quantity of partitions determined based on the first quantity of partitions; and modifying the autoscaler based on the updated load value and in response to instantiating the second set of partitions.

Example 2 is the method of any of example(s) 1 and 3-10, wherein the first quantity of partitions is selected based on n-modular redundancy.

Example 3 is the method of any of example(s) 1-2 and 4-10, wherein the second quantity of partitions is equal to the first quantity of partitions.

Example 4 is the method of any of example(s) 1-3 and 5-10, wherein the second quantity of partitions further determined based on a quantity of partitions that have been instantiated.

Example 5 is the method of any of example(s) 1-4 and 6-10, wherein the load value is detected in real-time.

Example 6 is the method of any of example(s) 1-5 and 7-10, wherein the threshold is determined based on a quantity of instantiated partitions.

Example 7 is the method of any of example(s) 1-6 and 8-10, wherein the threshold is determined by a machine-learning model configured to maximize a system stability metric.

Example 8 is the method of any of example(s) 1-7 and 9-10, further comprising: determining that the load value is greater than the threshold for a predetermined time interval, wherein instantiating the second set of partitions is further in response to determining that the load value is greater than the threshold for the predetermined time interval.

Example 9 is the method of any of example(s) 1-8 and 10, wherein a length of the predetermined time interval is determined based on a quantity of instantiated partitions.

Example 10 is the method of any of example(s) 1-9, wherein each partition of the first set of partitions includes a set of containers, and wherein each container includes an environment configured to execute one or more applications accessible to one or more users.

Example 11 is a system comprising: one or more processors; and a machine-readable storage medium storing instructions that when executed by the one or more processors, cause the one or more processors to perform the methods of any of example(s)s 1-10.

Example 12 is a machine-readable storage medium storing instructions that when executed by one or more processors, cause the one or more processors to perform the methods of any of example(s)s 1-10.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included (e.g., in FIG. 4). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
   receiving historical resource allocation data associated with a service deployed within a distributed network;
   training a machine-learning model using the historical resource allocation data, the machine-learning model being configured to generate a threshold processing load usable to determine when processing resources allocated to a particular service within a particular distributed network are to be increased;
   instantiating, by an autoscaler, a first set of partitions with a processing node, the first set of partitions configured to support the particular service accessible by a plurality of users, the first set of partitions including a first quantity of partitions;
   receiving a load value corresponding to the first set of partitions;
   executing the machine-learning model using the load value, the machine-learning model generating a threshold processing load;
   receiving an updated load value corresponding to the first set of partitions;
   determining that the updated load value is greater than the threshold processing load;
   instantiating, by the autoscaler and in response to determining that the updated load value is greater than the threshold processing load, a second set of partitions including a second quantity of partitions determined based on a scaling value, wherein the scaling value decreases as a quantity of partitions that have been instantiated increases; and
   modifying the autoscaler and the machine-learning model based on the updated load value and in response to instantiating the second set of partitions.

2. The method of claim 1, wherein the first quantity of partitions is selected based on n-modular redundancy.

3. The method of claim 1, wherein the second quantity of partitions is equal to the first quantity of partitions.

4. The method of claim 1, wherein the second quantity of partitions further determined based on a quantity of partitions that have been instantiated.

5. The method of claim 1,
   wherein instantiating the second set of partitions is further in response to determining that the load value is greater than the threshold processing load for a predetermined time interval.

6. The method of claim 5, wherein a length of the predetermined time interval is determined based on a quantity of instantiated partitions.

7. The method of claim 1, wherein each partition of the first set of partitions includes a set of containers, and wherein each container includes an environment configured to execute one or more applications accessible to one or more users.

8. A system comprising:
one or more processors; and
a machine-readable storage medium storing instructions that when executed by the one or more processors, cause the one or more processors to perform operations including:
receiving historical resource allocation data associated with a service deployed within a distributed network;
training a machine-learning model using the historical resource allocation data, the machine-learning model being configured to generate a threshold processing load usable to determine when processing resources allocated to a particular service within a particular distributed network are to be increased;
instantiating, by an autoscaler, a first set of partitions with a processing node, the first set of partitions configured to support the particular service accessible by a plurality of users, the first set of partitions including a first quantity of partitions;
receiving a load value corresponding to the first set of partitions;
executing the machine-learning model using the load value, the machine-learning model generating a threshold processing load;
receiving an updated load value corresponding to the first set of partitions;
determining that the updated load value is greater than the threshold processing load;
instantiating, by the autoscaler and in response to determining that the updated load value is greater than the threshold processing load, a second set of partitions including a second quantity of partitions determined based on a scaling value, wherein the scaling value decreases as a quantity of partitions that have been instantiated increases; and
modifying the autoscaler based and the machine-learning model on the updated load value and in response to instantiating the second set of partitions.

9. The system of claim 8, wherein the first quantity of partitions is selected based on n-modular redundancy.

10. The system of claim 8, wherein the second quantity of partitions is equal to the first quantity of partitions.

11. The system of claim 8, wherein the second quantity of partitions further determined based on a quantity of partitions that have been instantiated.

12. The system of claim 8,
wherein instantiating the second set of partitions is further in response to determining that the load value is greater than the threshold processing load for a predetermined time interval.

13. The system of claim 12, wherein a length of the predetermined time interval is determined based on a quantity of instantiated partitions.

14. The method of claim 1, wherein each partition of the first set of partitions includes a set of containers, and wherein each container includes an environment configured to execute one or more applications accessible to one or more users.

15. A non-transitory computer-readable storage medium storing instructions that when executed by one or more processors, cause the one or more processors to perform operations including:
receiving historical resource allocation data associated with a service deployed within a distributed network;
training a machine-learning model using the historical resource allocation data, the machine-learning model being configured to generate a threshold processing load usable to determine when processing resources allocated to a particular service within a particular distributed network are to be increased;
instantiating, by an autoscaler, a first set of partitions with a processing node, the first set of partitions configured to support the particular service accessible by a plurality of users, the first set of partitions including a first quantity of partitions;
receiving a load value corresponding to the first set of partitions;
executing the machine-learning model using the load value, the machine-learning model generating a threshold processing load;
receiving an updated load value corresponding to the first set of partitions;
determining that the updated load value is greater than the threshold processing load;
instantiating, by the autoscaler and in response to determining that the updated load value is greater than the threshold processing load, a second set of partitions including a second quantity of partitions determined based on a scaling value, wherein the scaling value decreases as a quantity of partitions that have been instantiated increases; and
modifying the autoscaler and the machine-learning model based on the updated load value and in response to instantiating the second set of partitions.

16. The non-transitory computer-readable storage medium of claim 15, wherein the first quantity of partitions is selected based on n-modular redundancy.

17. The non-transitory computer-readable storage medium of claim 15, wherein the second quantity of partitions is equal to the first quantity of partitions.

18. The non-transitory computer-readable storage medium of claim 15, wherein the second quantity of partitions further determined based on a quantity of partitions that have been instantiated.

19. The non-transitory computer-readable storage medium of claim 15,
wherein instantiating the second set of partitions is further in response to determining that the load value is greater than the threshold processing load for a predetermined time interval.

20. The non-transitory computer-readable storage medium of claim 19, wherein a length of the predetermined time interval is determined based on a quantity of instantiated partitions.

* * * * *